(12) United States Patent
Singh et al.

(10) Patent No.: US 12,472,273 B2
(45) Date of Patent: Nov. 18, 2025

(54) STERILIZATION PROCESS OF TIMOLOL GEL FORMING SOLUTION THROUGH ASEPTIC FILTRATION

(71) Applicant: SENTISS PHARMA PRIVATE LIMITED, New Delhi (IN)

(72) Inventors: Manish Kumar Singh, Haryana (IN); Sai Kiran Jana, Haryana (IN); Mallinath Harwalkar, Haryana (IN); Kishor Deo, Haryana (IN); Deepak Bahri, Haryana (IN)

(73) Assignee: Sentiss Pharma Private Limited, New Delhi (IN)

( * ) Notice: Subject to any disclaimer, the term of this patent is extended or adjusted under 35 U.S.C. 154(b) by 539 days.

(21) Appl. No.: 17/995,071

(22) PCT Filed: Mar. 30, 2021

(86) PCT No.: PCT/IB2021/052635
§ 371 (c)(1),
(2) Date: Sep. 29, 2022

(87) PCT Pub. No.: WO2021/198911
PCT Pub. Date: Oct. 7, 2021

(65) Prior Publication Data
US 2023/0143595 A1    May 11, 2023

(30) Foreign Application Priority Data
Mar. 31, 2020 (IN) .............................. 202011014180

(51) Int. Cl.
| | |
|---|---|
| A61K 31/5377 | (2006.01) |
| A61K 9/00 | (2006.01) |
| A61K 47/18 | (2017.01) |
| A61K 47/26 | (2006.01) |
| A61K 47/36 | (2006.01) |
| A61L 2/00 | (2006.01) |

(52) U.S. Cl.
CPC .......... *A61L 2/0017* (2013.01); *A61K 9/0024* (2013.01); *A61K 9/0048* (2013.01); *A61K 31/5377* (2013.01); *A61K 47/18* (2013.01); *A61K 47/26* (2013.01); *A61K 47/36* (2013.01)

(58) Field of Classification Search
CPC ... A61L 2/0017; A61K 9/0024; A61K 9/0048; A61K 31/5377; A61K 47/18; A61K 47/26; A61K 47/36
See application file for complete search history.

(56) References Cited

U.S. PATENT DOCUMENTS

| | | |
|---|---|---|
| 4,861,760 A | 8/1989 | Mazuel et al. |
| 2016/0235665 A1 | 8/2016 | Shah et al. |

FOREIGN PATENT DOCUMENTS

| | | |
|---|---|---|
| WO | WO 2000/035439 | 6/2000 |

OTHER PUBLICATIONS

Bhalerao et al., "Design, optimisation and evaluation of in situ gelling nanoemulsion formulations of brinzolamide," Drug Delivery and Translational Research, Dec. 9, 2019, 10(2):529-547, 19 pages.
Bhalerao et al., "Levofloxacin Hemihydrate In Situ Gelling Ophthalmic Solution: Formulation Optimization and In Vitro and In Vivo Evaluation," AAPS PharmSciTech., Aug. 1, 2019, 20(7):272, 12 pages.
International Preliminary Report on Patentability in International Appln. No. PCT/IB2021/052635, mailed Oct. 13, 2022, 9 pages.
International Search Report and Written Opinion in International Appln. No. PCT/IB2021/052635, mailed Jul. 19, 2021, 12 pages.
Kellermann, "Instructions for use: GELRITE," Aug. 31, 2006, retrieved on Jan. 12, 2023, retrieved from URL <https://www.carlroth.com/medias/BA-0039-EN.pdf?context=bWFzdGVyfGluc3RydWN0aW9uc3w0NzgONTR8YXBwbGljYXRpb24vcGRmfGluc3RydWN0aW9ucy90OTUvaGVILzkwMzc3Mzc4ODU3MjYucGRmfDM4N2NkYzkzNjRjNzA4NjI5YWI3M2RIYzdlYjdkZWQyYmY3MDY5ODM1MzhjODQzZGIzZjhhODQ3NmM2NjU4M2Q>, 12 pages.
Mahlawat et al., "Comparative Analysis of Ophthalmic Gel Forming Polymers on the Drug Release of Timolol Maleate," International Research Journal of Pharmacy, Sep. 2018, 9(7):207-210, 5 pages.
TER Group: "Gellan Gum," Jul. 8, 2021, retrieved on Jan. 12, 2023, retrieved from URL <http://f01.s.alicdn.com/kf/HTB1GkUpFVXXXXbvXVXX.PRXFXXXM.pdf>, 14 pages.

*Primary Examiner* — Zohreh A Fay
(74) *Attorney, Agent, or Firm* — Fish & Richardson P.C.

(57) ABSTRACT

The present invention provides the sterilization of an ophthalmic composition comprising timolol or salt thereof optionally with pharmaceutically acceptable agent(s) wherein the sterilization is achieved through aseptic filtration technique. Further the present invention provides the sterilization process by optimising the process parameters by varying the heating time at a temperature to control the viscosity of the ophthalmic composition of present invention through aseptic filtration technique wherein the filtration is done under aseptic condition through 0.45 μm clarification pre-filter followed by 0.2μ sterilizing grade filter. The process is simple and economical.

6 Claims, 2 Drawing Sheets

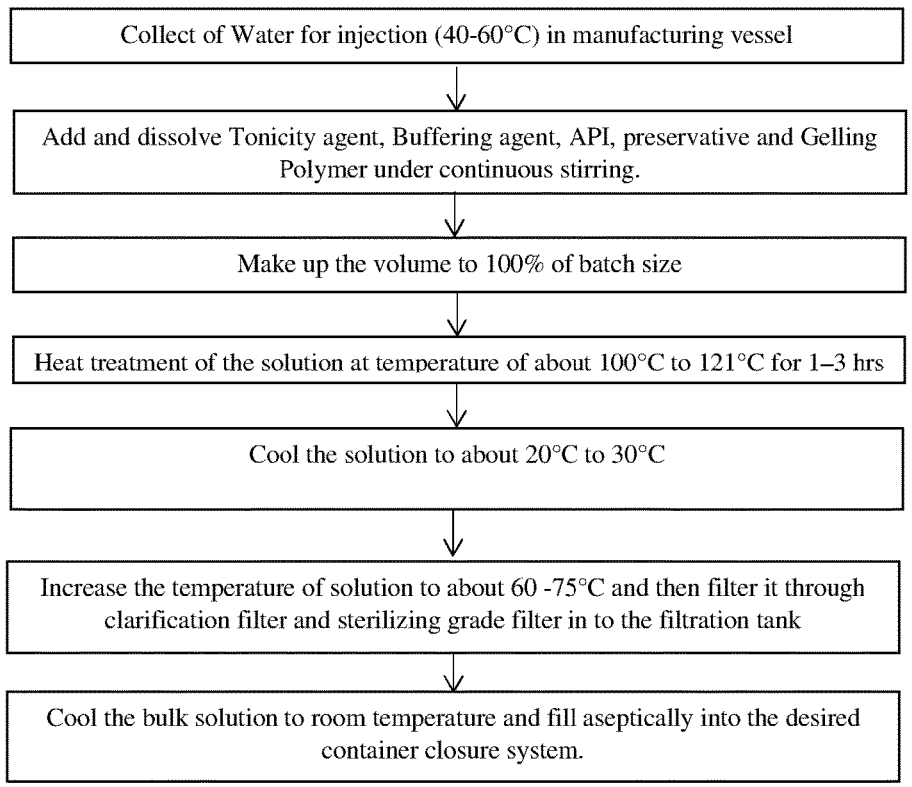
Figure 1: Flow diagram of a process to prepare timolol gel forming solution sterilized by aseptic filtration technique.

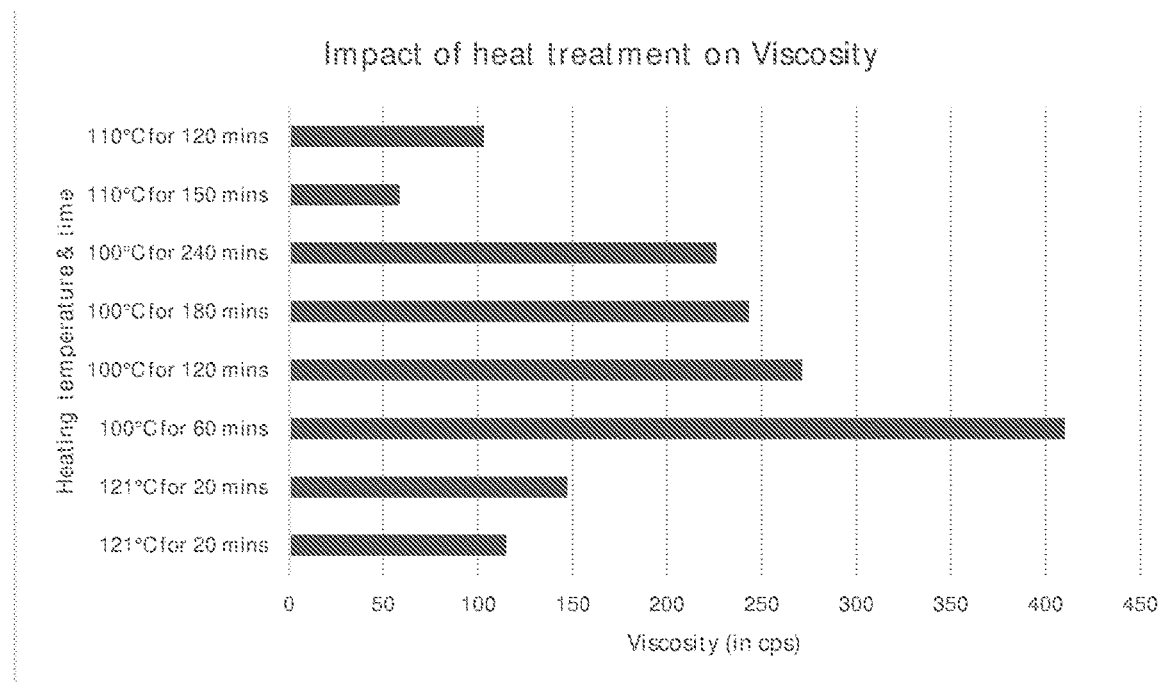
Figure 2: Effect of heating temperature and time on the viscosity of present composition.
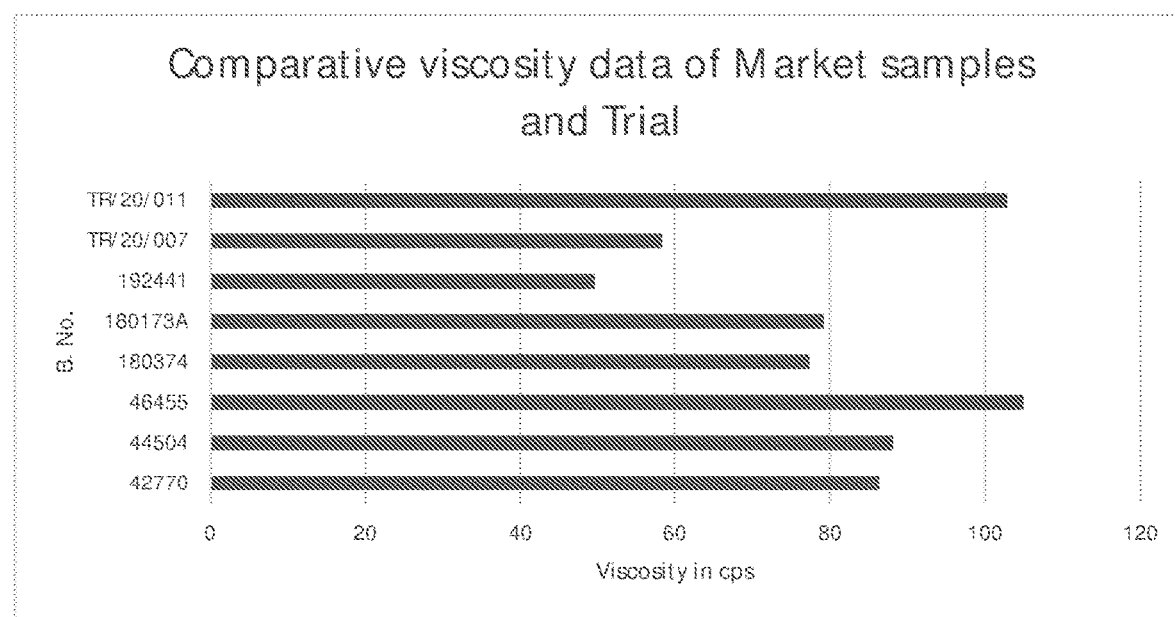
Figure 3: Viscosity comparison of Market samples and Trial samples.

STERILIZATION PROCESS OF TIMOLOL GEL FORMING SOLUTION THROUGH ASEPTIC FILTRATION

CROSS-REFERENCE TO RELATED APPLICATION

This application is a National Stage Application under 35 U.S.C. § 371 and claims the benefit of International Application No. PCT/IB2021/052635, filed Mar. 30, 2021, which claims priority to Indian Patent Application number 202011014180, filed Mar. 31, 2020, the disclosure of which is incorporated herein by reference.

FIELD OF THE INVENTION

The present invention relates to the pharmaceutical sciences. The present invention provides the sterilization process of an ophthalmic composition which comprises timolol or salt thereof optionally with pharmaceutically acceptable agent(s), wherein the sterilization is achieved through aseptic filtration technique.

Further the present invention provides the sterilization process by optimising the process parameters by varying the heating time at a temperature to control the viscosity of the ophthalmic composition of present invention through aseptic filtration technique wherein the filtration is done under aseptic condition through 0.45 µm clarification pre-filter followed by 0.2µ sterilizing grade filter. The process is simple and economical.

BACKGROUND AND RELEVANT ART

Drug sterility is crucial in the pharmaceutical industry for sterile products like in Ophthalmic and production of a sterile ophthalmic pharmaceutical product is often a technically challenging task. Regulatory bodies suggest that "whenever possible products intended to be sterile should be terminally sterilized by heat in their final container and where it is not possible to carryout terminal sterilization by heating due to the instability of a formulation or incompatibility of a pack type (e.g. plastic eye-dropper bottles), an alternative method for sterilization should be considered".

Sterilization can be achieved by the use of other techniques like moist or dry heat, by irradiation with ionizing radiation, by ethylene oxide (or other suitable gaseous sterilizing agents), or by filtration with subsequent aseptic filling of sterile final containers. Each method has its advantages and disadvantages.

Moist heat/Steam sterilization like autoclaving or in-situ heating of viscous ophthalmic dosage forms is common practice in pharmaceutical industry to make the product sterile. It involves heating the ophthalmic solution or suspension, to be sterilized, at 121° C. for about 15-20 minutes. However, in many cases it is not advisable due to heat sensitivity of the drug or excipients, incompatibility of excipients with drug at higher temperature and the overall cost involved. Additionally, in the case of a viscous pharmaceutical formulation, heat often alters the physical attributes of the formulation like appearance, viscosity by altering the properties of the polymer used.

Further, ophthalmic solutions containing heat stable polymers may be manufactured by using aseptic techniques. In these techniques, the polymer solution is prepared separately and then is sterilized by autoclaving. Active ingredient and other ingredients may be dissolved in water for injection and filter sterilized. The polymer solution and active ingredient solution were mixed and volume will be made up aseptically. This process is very complex and there is always high risk of sterile operations.

U.S. Pat. No. 4,861,760 discloses a pharmaceutical composition intended for contacting with a physiological liquid characterized in that said composition is intended to be administered as a non-gelled liquid form and is intended to gel in situ, this composition containing at least one polysaccharide in aqueous solution, of the type which undergoes liquid-gel phase transition gelling in situ under the effect of an increase in the ionic strength of said physiological liquid.

WO2000035439A1 provides a process of manufacturing of formulation of topical beta blockers with improved efficacy and wherein the final product is autoclaved and put into a sterile packaging.

While working on the development of timolol ophthalmic gel forming solution dosage form, the present inventors have embarked upon a simple technique, which eliminates the Steam sterilization or autoclaving of ophthalmic dosage forms to make the product sterile.

It was surprisingly found that aseptic filtration of the solution for ophthalmic administration comprising timolol or salt thereof, most preferably, the timolol maleate and one or more pharmaceutically acceptable agents can impart the same sterility to the ophthalmic dosage form as that obtained with steam sterilization, autoclaving and/or aseptic mixing, wherein the filtration is done under aseptic condition through 0.45 µm clarification pre-filter followed by 0.2µ filter. The novelty lies in the sterilization process through aseptic filtration technique and for that inventors have optimise the process parameters by varying the heating time at a temperature to control the viscosity of the ophthalmic composition of present invention and accordingly the filtration is done under aseptic condition through 0.45 µm clarification pre-filter followed by 0.2µ sterilizing grade filter.

OBJECTS OF THE INVENTION

The main object of the present invention is to provide the sterilization process by optimising the process parameters and by varying the heating time at a temperature to control the viscosity of the ophthalmic composition through aseptic filtration technique, wherein the filtration is done under aseptic condition through 0.45 µm clarification pre-filter followed by 0.2µ sterilizing grade filter.

Another object of the present invention is to provide the sterilization of an ophthalmic composition comprising timolol or salt thereof optionally with pharmaceutically acceptable agents wherein the sterilization is achieved through aseptic filtration technique.

Another object is to provide the sterilization process of ophthalmic composition of present invention through aseptic filtration technique wherein the filtration is done under aseptic condition through 0.45 µm clarification pre-filter followed by 0.2µ sterilizing grade filter.

Another object of the present invention is to provide an aseptically filled ophthalmic composition comprising timolol or salt thereof optionally with pharmaceutically acceptable agents, wherein the said composition is intended to be administered as a non-gelled liquid form and is intended to gel in situ after the administration.

Yet another object of the present invention is to provide the pharmaceutical compositions, in particular, the ophthalmic compositions and drug delivery vehicles which are administrable as liquids and gel upon contact with the eye.

BRIEF DESCRIPTION OF THE DRAWINGS

FIG. 1: Flow diagram of a process to prepare timolol gel forming solution sterilized by aseptic filtration technique.

FIG. 2: Effect of heating temperature and time on the viscosity of present composition. The details are presented below:

FIG. 3: Viscosity comparison of Market samples and Trial samples.

| Trial | Heating temperature & Time | Viscosity (in cps) |
|---|---|---|
| Trial-1 | 121° C. for 20 mins | 114.7 |
| Trial-2 | 121° C. for 20 mins | 146.9 |
| Trial-3 | 100° C. for 60 mins | 410 |
|  | 100° C. for 120 mins | 271 |
|  | 100° C. for 180 mins | 243 |
|  | 100° C. for 240 mins | 226 |
| Trial-4 | 110° C. for 150 mins | 58.35 |
| Trial-5 | 110° C. for 120 mins | 102.9 |

DETAILED DESCRIPTION OF THE INVENTION

The present invention provides the sterilization process of an ophthalmic composition comprising timolol or its pharmaceutically acceptable salt thereof, optionally with pharmaceutically acceptable agents wherein the sterilization is achieved through aseptic filtration technique.

The present invention provides the sterilization of ophthalmic composition through aseptic filtration technique wherein the filtration is done under aseptic condition through 0.45 µm clarification pre-filter followed by 0.2µ sterilizing grade filter.

The present invention provides the sterilization process by optimising the process parameters by varying the heating time at a temperature to control the viscosity of the ophthalmic composition wherein the sterilization is done by aseptic filtration technique and wherein further the filtration is done under aseptic condition through 0.45 µm clarification pre-filter followed by 0.2µ sterilizing grade filter.

The present invention provides an aseptically filled ophthalmic compositions comprising timolol or its pharmaceutically acceptable salt thereof, preferably timolol maleate optionally with pharmaceutically acceptable agents.

The present invention further provides an aseptically filled ophthalmic composition comprising timolol or salt thereof optionally with pharmaceutically acceptable agents wherein the said composition is intended to be administered as a non-gelled liquid form and is intended to gel in situ.

Furthermore, the present invention relates to ophthalmic compositions. In particular, this invention relates to ophthalmic compositions and drug delivery vehicles which are administrable as liquid(s) and which gel upon contact with the eye.

Timolol maleate is described chemically as: (−)-1-(tert-butylamino)-3-[(4-morpholino-1,2,5-thiadiazol-3-yl)oxy]-2-propanol maleate (1:1) salt. Timolol maleate possesses an asymmetric carbon atom in its structure and is provided as the levo-isomer.

In one of the embodiments, the present ophthalmic composition of this invention comprises from about 0.01 to 1% (w/v) of beta-blocker, preferably about 0.1 to 0.5% (w/v).

In one of the embodiments, the present invention provides a process for preparing ophthalmic composition, the procedure involves preparation of bulk solution comprising other ingredients and actives and then heat treatment of the bulk solution in the manufacturing tank.

Further, the process involves the sterilization of timolol gel forming solution through aseptic filtration technique wherein the filtration of heated solution is done under aseptic condition through 0.45 µm clarification pre-filter followed by 0.2µ sterilizing grade filter, then aseptic mixing of bulk solution and aseptic filling.

In another embodiment, the present invention provides the sterilization process by optimising the process parameters by varying the heating time at a temperature to control the viscosity of the ophthalmic composition comprising timolol or its pharmaceutically acceptable salt thereof, preferably timolol maleate optionally with pharmaceutically acceptable agents.

In another embodiments, the sterilization is done by aseptic filtration technique and wherein further the filtration is done under aseptic condition through 0.45 µm clarification pre-filter followed by 0.2µ sterilizing grade filter.

In one aspect of the present invention, there is provided an aseptically filled ophthalmic solution dosage form comprising timolol or salt thereof optionally with pharmaceutically acceptable agents which is intended to be administered as a non-gelled liquid form and is intended to gel in situ.

In another aspect, there is provided a process for preparation of ophthalmic composition comprising timolol or salt thereof, an ion-activated gel-forming polymer and optionally with pharmaceutically acceptable agents wherein the said process comprises the sterilization of an ophthalmic composition through aseptic filtration technique.

In another aspect the ion-activated gel-forming polymer is gellan gum and is the only sole gelling polymer which is capable of gelling upon contact with the eye.

In one aspect the timolol may be present in the form of timolol maleate. Ophthalmic compositions of this invention comprise a therapeutically effective amount of timolol or salt thereof in gel forming solution form.

The ophthalmic composition of the present invention may be prepared by using pharmaceutically acceptable agents. Pharmaceutically acceptable agents may be selected from one or more of preservative, gelling polysaccharides, chelating agent, tonicity adjusting agent, buffering agent, thickening agent, surfactants, solubilizing agents, stabilizing agents, pH-adjusting agents and/or lubricants and the like.

The suitable gelling polysaccharides include xanthan gum, locust bean gum, gellan gum, carrageenans and combinations thereof. In one aspect of the present invention, the ophthalmic composition contains about 0.1% to about 2.0% by weight of gellan gum. The gellan gum has the property of changing from the liquid to the solid phase and gels upon contact with the eye.

Preservatives include but not limited to benzalkonium chloride, benzododecinium bromide, phenylmercuric acetate, chlorobutanol, benzyl alcohol, parabens, and thimerosal. Preferably, the preservative is benzalkonium chloride and more preferably the preservative is benzododecinium bromide.

The chelating agents for the purposes of this invention include but not limited to edetate salts like edetate disodium, edetate calcium disodium, edetate sodium, edetate trisodium, and edetate dipotassium.

Tonicity adjusting agents include but not limited to mannitol, sorbitol, sodium chloride, sodium borate, and the like and the mixtures thereof.

The thickening agent for the purposes of this invention include but not limited to one or more of hydroxyethyl cellulose, hydroxypropylmethyl cellulose, methyl cellulose, xanthan gum, gellan gum, polyvinyl pyrrolidone, corbopols and the like.

In another aspect the ophthalmic compositions according to this invention are administered in liquid form, such as an eye drops and administered in the usual manner for eye drops.

In another aspect the present invention is to provide a sterile ophthalmic composition of timolol or its pharmaceutically acceptable salts thereof for the treatment of elevated intraocular pressure in patients with ocular hypertension or open-angle glaucoma.

In another aspect the present invention is to provide a novel, simpler and effective process to prepare sterile ophthalmic composition timolol or its pharmaceutically acceptable salts in gel forming solution.

In a preferred embodiment, the ophthalmic composition having a pH value within the range of from about 5.0 to about 7.5, preferably from about 5.5 to about 7.1 and osmolality is within range of at about 250 mOsmol/kg to about 350 mOsmol/kg.

Any pharmaceutically acceptable packaging material may be use, preferably packaging material that is suitable for containing ophthalmic pharmaceutical formulation, more preferably the sterile ophthalmic composition.

Pharmaceutically acceptable packaging materials include but are not limited to low density polyethylene ("LDPE"), high density polyethylene ("HDPE"), polypropylene, polystyrene, polycarbonate, polyesters (such as polyethylene terephthalate and polyethylene naphthalate), nylon, polyvinyl chloride), poly(vinylidine chloride), poly(tetrafluoroethylene) and other materials known to those of ordinary skill in the art. Flexible bottles prepared from, or comprising. LDPE. HDPE or polypropylene are particularly preferred.

In one embodiment the composition of the present invention is sterile and preferably filled into sterile multi-use or single-use containers, preferably single-use containers.

In another embodiment the composition of the present invention is sterile and preferably filled into sterile multi-use or single-use containers, preferably multi-use containers.

Preferred containers include bottles, preferably a dropper (e.g., a bottle or ampule suitable for dropwise application of the composition), more preferably, a single or multi-use bottle or dropper. The containers are preferably sterilized, preferably prior to filling. Any suitable method can be used to sterilize the containers, and can be determined by the person of ordinary skill in the art. Some preferred methods include exposure to gamma irradiation and/or exposure to ethylene oxide gas.

Several sterilizing grade membrane filters are available for aseptic filtration of water based pharmaceutical ophthalmic dosage forms such as cellulose acetate, nylon, polyether sulfone (PES), polypropylene (PP), polyvinyl difluoride (PVDF) and the like.

The main embodiment of the present invention is to provide a process for preparing a sterile ophthalmic composition, the process comprising:
  a) Collecting the hot water in a manufacturing vessel at a temperature of about 40° C. to about 60° C., preferably about 50° C.;
  b) Preparing a solution by adding and dissolving Mannitol. Tromethamine, Timolol Maleate, Benzododecinium Bromide and Gellan Gum under continuous stirring and make up the volume to 100%;
  c) Heating the solution of step (b) at temperature of about 100° C. to about 121° C. by passing steam through the jacket of manufacturing vessel for a period of about 1 hrs to 3 hrs to reduce the viscosity of solution to the desired range;
  d) Cooling down the solution of step (c) to room temperature (25±5° C.);
  e) Increasing the temperature of the solution of step (d) to about 60° C. to about 75° C. to obtain a viscous solution and
  f) Aseptically filter the viscous solution of step (e) through a 0.45 μm clarification filter (pre-filter) followed by a 0.2μ sterilizing grade filter for the sterilization of the bulk solution;
  g) the filtered solution is aseptically filled into 3-piece vials.

In another embodiment of the present invention, the process does not include the autoclaving of the timolol maleate.

In another embodiment of the present invention, the sterilization process does not include the autoclaving of the ophthalmic composition.

In another embodiment of the present invention, the heating of the solution is preferably done at a temperature of about 105° C. to about 115° C.

In another embodiment of the present invention, the viscosity of the composition is controlled by optimizing the heating time of the solution for 2 hrs.

In another embodiment of the present invention, the ophthalmic composition is intended to be administered as a non-gelled liquid form and is intended to gel in situ after the administration.

Yet another embodiment of the present invention provides a process for preparing the sterilized ophthalmic composition, comprising an effective amount of timolol or its salt thereof wherein the process comprising sterilization of the ophthalmic composition which is achieved through aseptic filtration technique.

In another embodiment of the present invention, the filtration is done under aseptic condition through a clarification pre-filter followed by a sterilizing grade filter.

In another embodiment of the present invention, the clarification pre-filter is of 0.45 μm in size and sterilizing grade filter of 0.2μ in size.

Yet another embodiment of the present invention provides a process for preparing an ophthalmic composition comprising an effective amount of timolol or its salt thereof wherein the process includes sterilization of ophthalmic composition through aseptic filtration technique wherein the filtration is done under aseptic condition through 0.45 μm clarification pre-filter followed by 0.2μ sterilizing grade filter at temperature about 60° C. to about 75° C.

In another embodiment of the present invention, the ophthalmic composition is intended to be administered as a non-gelled liquid form and is intended to gel in situ after the administration.

In another embodiment of the present invention, the ophthalmic composition is administrable as liquid(s) and which gel upon contact with the eye.

In another embodiment of the present invention, the ophthalmic composition is administrable as liquid(s) and which gel upon contact with the eye.

In another embodiment of the present invention, the ophthalmic composition comprising timolol or salt thereof optionally with pharmaceutically acceptable agents wherein the sterilization is achieved through aseptic filtration technique.

In another embodiment of the present invention, the ophthalmic composition having a pH value within the range of from about 5.0 to about 7.5, preferably from about 5.5 to about 7.1 and osmolality is within range of at about 250 mOsmol/kg to about 350 mOsmol/kg.

In another embodiment of the present invention, the ophthalmic composition having a viscosity value within the range of from about 40 cps to about 150 cps, preferably from about 50 cps to about 120 cps and more preferably from about 70 cps to about 110 cps.

While the present invention has been described in terms of its specific embodiments, certain modifications and equivalents will be apparent to those skilled in the art and are intended to be included within the scope of the present invention.

EXAMPLES

Following formulations are the representative of the preferred composition of the present invention but are not intended to limit the scope of the present invention in any respect.

Example 1

| INGREDIENTS | Quantities in mg/mL |
| --- | --- |
| Timolol maleate* | 6.8 |
| Benzododecinium bromide | 0.12 |
| Gellan gum | 5.9 |
| Mannitol | 40.93 |
| Tromethamine | 1.8 |
| Water for injection | qs to 1 mL |

*Timolol Maleate 6.8 mg equivalent to Timolol 5 mg.

Procedure:—The following below procedure is followed to manufacture the ophthalmic compositions of the above examples.

I. Manufacturing of Bulk Solution:
1) Collect the hot Water for Injection in a manufacturing vessel at a temperature of about 40° C. to about 60° C., preferably about 50° C.
2) Add and dissolve of Mannitol, Tromethamine, Timolol Maleate, Benzododecinium Bromide and Gellan Gum under continuous stirring.
3) Make up the volume to 100% of the batch size with Water for Injection.
4) Heat the solution at temperature of about 100° C. to about 121° C., preferably at a temperature of about 105° C. to about 115° C. by passing steam through the jacket of manufacturing vessel for a period of about 1 hrs to 3 hrs, preferably about 2 hrs to reduce the viscosity of formulation to the desired range.
5) Stop the heating and cool the solution to room temperature (25±5° C.).

II. Filtration and Filling:
1) Increase the temperature of solution to range about 60° C. to about 75° C. and aseptically filter viscous solution through a 0.45 μm clarification filter (pre-filter) followed by a 0.2μ sterilizing grade filter for the sterilization of the bulk solution.
2) The filtered solution was aseptically filled into 3-piece vials and loaded into stability.

Method: Below is the method to carry out the Viscosity of the market samples:
1. Description: Transfer 15-20 mL of sample in a clean, dry test tube and examine visually for colour and nature of solution.
2. pH: Transfer 15-20 mL sample in a suitable dry test tube/glass beaker and measure the pH of the sample solution by using a suitable calibrated pH meter.
3. Osmolarity: Take 50 μL-200 μL sample as per the instrument make/model (Osmomate 030 or n Advanced Instruments) in a sample tube and measure the Osmolality using suitable previously calibrated Osmometer. The instrument will directly display the osmolality in mOsmol/Kg. Convert the value of Osmolality to Osmolarity using formula as mentioned below.

Osmolarity (£c) {mOsmol/L}=1000 £m/(1000/ρ+ ΣWiVi)

Where:
£m=Osmolality of solution (measured by instrument)
ρ=Density of sample
Wi=Weight of specific solute (g)
Vi=Partial specific volume 4. Viscosity: Add about 9 mL of sample in the sampling vessel and assemble the small sample adapter of Brookfield LV DV-II+Pro viscometer or Brookfield LV DV-I+ viscometer. Insert and centrally place the spindle no S-31 in the test sample and adjust the temperature of the sample such that it is maintained at about 25±0.1° C. Set the speed at 100 rpm. Switch the motor ON and allow time for the reading to stabilize for about 15 minutes. After 15 minutes, record the value of viscosity. The data of the market samples are provided below in Table 1.

TABLE 1

Data of the market samples:

| Market Samples | batch numbers | Description | pH | Osmolarity | Viscosity |
| --- | --- | --- | --- | --- | --- |
| Timoptic-XE ® 0.5% by Valeant Pharmaceuticals | 42770 | Clear, colorless, viscous solution | 6.72 | 284 mOsmol/L | 86.4 cps |
| | 44504 | Clear, colorless, viscous solution | 6.78 | 284 mOsmol/L | 88.2 cps |
| | 46455 | Clear, colorless, viscous solution | 6.87 | 283 mOsmol/L | 105.0 cps |
| Timolol maleate ophthalmic gel forming solution, 0.5% by Bausch + Lomb | 180374 | Clear, colorless, viscous solution | 6.82 | 286 mOsmol/L | 77.3 cps |
| | 180173A | Clear, colorless, viscous solution | 6.84 | 289 mOsmol/L | 79.20 cps |
| | 192441 | Clear, colorless, viscous solution | 6.84 | 285 mOsmol/L | 49.65 cps |

Observation: The above data suggests that the pH, osmolarity and viscosity of market samples were in the range of 6.7-6.9, 280-290 mOsmoL and 49-105 cps respectively.

Inference: Viscosity of the composition was observed to be critical quality attribute based on the data of the market samples and it was necessary to achieve the viscosity within the limits of Market samples.

Different trails are performed with the above manufacturing process and below are the results of the trails.

Trial-1 was manufactured as per the above manufacturing process and the bulk solution was heated at about 121° C. for 20 mins. In-process results of the batch were presented below in Table 2.

TABLE 2

Timolol maleate Oph. Gel Forming Solution 0.5% (B. No: N20065)

| Sl. No. | Sample detail | Appearance | Viscosity |
|---|---|---|---|
| 1 | After volume make up | Clear, colorless viscous solution | 1207 cps |
| 2 | After heat treatment at 121° C. for 20 mins | Clear, colorless viscous solution | 113.2 cps |
| 3 | After filtration | Clear, colorless viscous solution | 114.7 cps |

Trial-2 was manufactured as per the above manufacturing process and the bulk solution was heated at about 121° C. for 20 mins. In-process results of the batch were presented below in Table 3.

TABLE 3

Timolol maleate Oph. Gel Forming Solution 0.5% (B. No: TR/18/041)

| Sl. No. | Sample detail | Appearance | Viscosity |
|---|---|---|---|
| 1 | After volume make up | Clear, colorless viscous solution | 881.4 cps |
| 2 | After heat treatment at 121° C. for 20 mins | Clear, colorless viscous solution | 145.2 cps |
| 3 | After filtration | Clear, colorless viscous solution | 146.9 cps |

Observation: The above data indicates that the viscosity of the product was outside the range of marketed samples (refer tab 1 for market sample viscosity date) when hated at 121° C. for 20 mins.

Further optimization of heat treatment time to achieve the desired viscosity would not be feasible since higher temperature can cause the variation as observed in the above batches (Trials 1 & 2). So further optimization shall be done at lower temperature.

Trial-3 was manufactured as per the above manufacturing process and the bulk solution was heated at about 100° C. for 240 mins. Samples were collected at different time intervals (60 mins; 120 mins; 180 mins & 240 mins) and evaluated for viscosity to verify the feasibility of process.

TABLE 4

Timolol maleate Oph. Gel Forming Solution 0.5% (B. No: PR3F041-90)

| Detail | Viscosity |
|---|---|
| Heat treatment at 100° C. for 60 mins | 410 cps |
| Heat treatment at 100° C. for 120 mins | 271 cps |
| Heat treatment at 100° C. for 180 mins | 243 cps |
| Heat treatment at 100° C. for 240 mins | 226 cps |

Observation: The data indicates that the viscosity of the product will be decreased if heated at 100° C., but it will take longer time to achieve the desired viscosity which is commercially not feasible.

Trial-4 was manufactured as per the above manufacturing process and the bulk solution was heated at about 110° C. for 2 hrs 30 mins. In-process results of the batch were presented below in Table 5.

TABLE 5

Timolol maleate Oph. Gel Forming Solution 0.5% (B. No: TR/20/007)

| Sl. No. | Sample detail | Appearance | Viscosity |
|---|---|---|---|
| 1 | After volume make up | Clear, colorless viscous solution | 1006 cps |
| 2 | After heat treatment at 110° C. for 2 hrs 30 mins | Clear, colorless viscous solution | 57.60 cps |
| 3 | After filtration | Clear, colorless viscous solution | 58.35 cps |

Then batch (B. No: TR/20/007) was loaded into stability at 40° C./NMT25% RH for 6 months and the data was presented below in Table 6.

TABLE 6

| | | 40° C./NMT25% RH | |
|---|---|---|---|
| Stability Condition Test parameter | Initial | 3 M | 6 M |
| Appearance | Clear colorless viscous solution | Clear colorless, viscous solution | Clear colorless, viscous solution |
| pH | 6.85 | 6.72 | 6.68 |
| Osmolarity (mOsmol/L) | 294 | 301 | 306 |
| Viscosity (cps) | 56.4 | 51.3 | 42.45 |

Observation: The data indicates that the viscosity of the product was below the 50 cps which is outside the range of marketed samples (refer table 1 for market sample viscosity date) after accelerated stability at 40° C./NMT25% RH for 6 months. The data of the pH and Osmolarity were not significantly changed and are comparable to the market samples.

Inference: Based on the above trials it can be observed that viscosity of the formulation is impacted by the temperature and duration of heat treatment of the solution. Even though the viscosity of the formulation was within the desired range initially when the bulk solution was heated at about 110° C. for 2 hrs 30 mins. the viscosity of the product may decrease on stability and may go out of the range (refer table 1 for market sample viscosity range). Therefore, it is required to optimize the time of heat treatment so that the viscosity of the product will be in the desired range even at the end of shelf life or end of accelerated stability study.

Thus, there felt a need to optimise the process parameters so that the viscosity will be controlled or not dropped below 50 cps as it is observed from the market samples that the viscosity would be in the range of 49-105 cps.

Thus, the inventors of the present invention have developed a sterilization process by optimising the process parameters by varying the heating time at a temperature to control the viscosity of the ophthalmic composition comprising timolol or salt thereof optionally with pharmaceutically acceptable agents.

Further the sterilization is done by aseptic filtration technique and wherein further the filtration is done under aseptic condition through 0.45 μm clarification pre-filter followed by 0.2μ sterilizing grade filter.

Trial-5 (B. No: TR/20/011):

Trial-5 was manufactured as per the above manufacturing process and the bulk solution was heated at about 110° C. for 2 hrs. In-process results of the batch were presented below in

TABLE 7

Timolol maleate Oph. Gel Forming Solution 0.5% (B. No: TR/20/011)

| Sl. No. | Sample detail | Appearance | Viscosity |
|---|---|---|---|
| 1 | After volume make up | Clear, colorless viscous solution | 799.2 cps |
| 2 | After heat treatment at about 110° C. for 2 hrs | Clear, colorless viscous solution | 97.8 cps |
| 3 | After filtration | Clear, colorless viscous solution | 102.9 cps |

Then the batch (B. No: TR/20/011) was loaded into stability at 40° C./NMT25% RH for 6 months and the data was presented below in Table 8.

TABLE 8

Timolol maleate Oph. Gel Forming Solution 0.5% (B. No: TR/20/011)

| | | 40° C./NMT25% RH | |
|---|---|---|---|
| Stability Condition | Initial | 3 M | 6 M |
| Test parameter Appearance | Clear, colorless viscous solution | Clear, colorless viscous solution | Clear, colorless viscous solution |
| pH | 6.85 | 6.75 | 6.65 |
| Osmolarity (mOsmol/L) | 296 | 302 | 303 |
| Viscosity (cps) | 102.9 | 85.5 | 82.5 |
| Assay of Timolol | 99.2% | 97.5% | 96.9% |
| Content of Benzododecinium Bromide | 101.5% | 100.3% | 95.5% |
| Related substances | | | |
| Timolol related compound B | 0.31% | 0.32% | 0.34% |
| Timolol related compound G | 0.20% | 0.42% | 0.37% |
| Timolol related compound D | 0.02% | ND | ND |
| Highest unknown impurity | 0.04% | 0.07% | 0.09% |
| Total Impurities | 0.57% | 0.81% | 0.80% |

Observation: The data from Table 8 indicates that the viscosity of the current formulation was within the range of market samples (refer table 1 for market sample viscosity data) even after accelerated stability at 40° C./NMT25% RH for 6 months. The sample was further evaluated for pH, Osmolarity. Assay of Timolol, Content for Benzodocinium bromide and Related substances. The results indicate that the formulation was stable even at accelerated stability at 40° C./NMT25% RH for 6 months as there is no significant change observed from the initial.

Thus, the inventors of the present invention have developed a simple and effective sterilization process by optimising the process parameters by varying the heating time at a temperature to control the viscosity of the ophthalmic composition comprising timolol or salt thereof optionally with pharmaceutically acceptable agents.

Further, the sterilization is done by aseptic filtration technique and wherein further the filtration is done under aseptic condition through 0.45 μm clarification pre-filter followed by 0.2μ sterilizing grade filter.

The present invention has been described in terms of its specific embodiments, certain modifications and equivalents will be apparent to those skilled in the art and are included within the scope of the present invention. The examples are provided to illustrate particular aspects of the present invention and do not limit the scope of the present invention as defined by the claims.

UTILITY OF THE PRESENT INVENTION

The present inventors have provided a process for preparing a sterile ophthalmic composition.

The process of preparation is simple and economical.

The invention claimed is:

1. A process for preparing a sterile ophthalmic composition, the process comprising:
    a) Collecting hot water in a manufacturing vessel at a temperature of about 40° C. to about 60° C.;
    b) Preparing a solution by adding and dissolving in the hot water Mannitol, Tromethamine, Timolol Maleate, Benzododecinium Bromide and Gellan Gum under continuous stirring and making up the volume to 100%;
    c) Heating the solution of step (b) at a temperature of about 105° C. to about 115° C. by passing steam through a jacket of the manufacturing vessel for a period of about 1 hrs to 3 hrs to reduce the viscosity of the solution to a desired range of 70 cps to 110 cps;
    d) Cooling down the solution of step (c) to 25±5° C.;
    e) Increasing the temperature of the solution of step (d) to about 60° C. to about 75° C. to obtain a viscous solution;
    f) Aseptically filtering the viscous solution of step (e) through a 0.45 μm clarification filter (pre-filter) followed by a 0.2μ sterilizing grade filter to sterilize the viscous solution; and
    g) Aseptically filling the filtered solution of step (f) into 3-piece vials,
    wherein the process does not include autoclaving.

2. The process as claimed in claim 1, wherein the viscosity of the composition is controlled by optimizing the heating time of the solution for 2 hrs.

3. The process as claimed in claim 1, wherein the ophthalmic composition is intended to be administered as a non-gelled liquid form and is intended to gel in situ after the administration.

4. The process as claimed in claim 1, wherein the ophthalmic composition has a pH value within the range of from about 5.0 to about 7.5, and an osmolality within the range of about 250 mOsmol/kg to about 350 mOsmol/kg.

5. The process as claimed in claim 4, wherein the ophthalmic composition has a pH value within the range of from about 5.5 to about 7.1.

6. The process as claimed in claim 1, wherein the hot water is collected in the manufacturing vessel at a temperature of about 50° C.

* * * * *